(12) United States Patent
Kwon et al.

(10) Patent No.: US 9,012,355 B2
(45) Date of Patent: Apr. 21, 2015

(54) ADSORBENT FOR CARBON DIOXIDE, METHOD OF PREPARING THE SAME, AND CAPTURE MODULE FOR CARBON DIOXIDE INCLUDING THE SAME

(71) Applicant: Samsung Electronics Co., Ltd., Suwon-si (KR)

(72) Inventors: Hyuk Jae Kwon, Suwon-si (KR); Soon Chul Kwon, Hwaseong-si (KR); Jeong Gil Seo, Yongin-si (KR); Hyun Chul Lee, Hwaseong-si (KR); Young Gil Jo, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 215 days.

(21) Appl. No.: 13/845,738

(22) Filed: Mar. 18, 2013

(65) Prior Publication Data
US 2013/0260990 A1    Oct. 3, 2013

(30) Foreign Application Priority Data
Mar. 28, 2012  (KR) .......................... 10-2012-0031884

(51) Int. Cl.
*B01J 20/00* (2006.01)
*B01J 20/04* (2006.01)
*B01J 20/06* (2006.01)
*B01J 20/08* (2006.01)
*B01D 53/62* (2006.01)

(52) U.S. Cl.
CPC ............... *B01J 20/041* (2013.01); *Y02C 10/08* (2013.01); *B01J 20/06* (2013.01); *B01J 20/08* (2013.01); *B01D 53/62* (2013.01); *B01D 2253/1124* (2013.01); *B01D 2253/25* (2013.01); *B01D 2257/504* (2013.01)

(58) Field of Classification Search
CPC .......... B01J 20/041; B01J 20/08; B01J 20/06; B01D 53/62; B01D 2253/25; B01D 2253/1124; B01D 2257/504; Y02C 10/08
USPC .................................................. 502/400, 414
See application file for complete search history.

(56) References Cited

U.S. PATENT DOCUMENTS

| | | | |
|---|---|---|---|
| 4,774,212 A | 9/1988 | Drezdon | |
| 4,843,168 A | 6/1989 | Drezdzon et al. | |
| 5,079,203 A | 1/1992 | Pinnavaia et al. | |
| 2003/0191040 A1* | 10/2003 | Adriaanse et al. | 510/267 |
| 2007/0191213 A1* | 8/2007 | Jones et al. | 502/20 |
| 2008/0176130 A1* | 7/2008 | Kim et al. | 429/46 |
| 2010/0294669 A1* | 11/2010 | Abys et al. | 205/239 |
| 2012/0119200 A1* | 5/2012 | Ueno et al. | 257/40 |

FOREIGN PATENT DOCUMENTS

KR   20110047302 A   5/2011

* cited by examiner

*Primary Examiner* — Anthony J Zimmer
(74) *Attorney, Agent, or Firm* — Harness, Dickey & Pierce, P.L.C.

(57) ABSTRACT

An adsorbent for carbon dioxide may include a composite metal oxide including a divalent first metal ($M^1$), a trivalent second metal ($M^2$), and at least one polyoxometalate (POM) ion selected from an anion represented by a first formula (e.g., Chemical Formula 1) and an anion represented by a second formula (e.g., Chemical Formula 2). A capture module for carbon dioxide may include the adsorbent.

22 Claims, 4 Drawing Sheets

ADSORBENT FOR CARBON DIOXIDE, METHOD OF PREPARING THE SAME, AND CAPTURE MODULE FOR CARBON DIOXIDE INCLUDING THE SAME

CROSS-REFERENCE TO RELATED APPLICATION

This application claims priority under 35 U.S.C. §119 to Korean Patent Application No. 10-2012-0031884, filed in the Korean Intellectual Property Office on Mar. 28, 2012, the entire contents of which are incorporated herein by reference.

BACKGROUND

1. Field

The present disclosure relates to an adsorbent for carbon dioxide, a method of preparing the same, and a capture module for carbon dioxide including the same.

2. Description of the Related Art

As fossil fuels are increasingly used, more carbon dioxide (which is believed to have a very serious influence on global warming) is emitted into the air as a result. Accordingly, research has been undertaken on the removal of carbon dioxide from the flue gas generated when fossil fuels are combusted, the syngas generated when coal is gasified, and the fuel gas generated when natural gas is reformed.

The removal of carbon dioxide from flue gas may be performed in an adsorption method (e.g., a wet chemical absorption method, a dry chemical absorption method), a membrane separation method, and the like. In order to capture a relatively large amount of carbon dioxide from flue gas, an adsorbent having improved adsorption performance is desired.

In general, an adsorbent may be classified as an adsorbent for a relatively low temperature (0° C. to room temperature) such as MOF (metal organic framework)/ZIF (zeolitic-imidazolate framework), zeolite, carbon, and the like, an adsorbent for a middle temperature (about 150 to about 400° C.) such as hydrotalcite and the like, and an adsorbent for a relatively high temperature (greater than or equal to about 500° C.). However, these adsorbents involve relatively complex processes and added costs, since the flue gas discharged after combustion should be cooled or heated.

SUMMARY

Some embodiments relate to an adsorbent for carbon dioxide, which has improved adsorption performance and thermal stability and works at a relatively high temperature.

Some embodiments relate to a method of preparing the adsorbent for carbon dioxide, and a capture module for carbon dioxide including the same.

An adsorbent for carbon dioxide may include a composite metal oxide including a divalent first metal ($M^1$), a trivalent second metal ($M^2$), and at least one polyoxometalate (POM) ion selected from an anion represented by the following Chemical Formula 1 and an anion represented by the following Chemical Formula 2.

$$[M^3{}_6O_{19}]^{2-} \quad \text{[Chemical Formula 1]}$$

In Chemical Formula 1,
$M^3$ is selected from Mo, W, and a combination thereof.

$$[(XO_4)_a M^4{}_{6b}O_{18b}]^{3a-} \quad \text{[Chemical Formula 2]}$$

In Chemical Formula 2,
X is selected from P, Si, As, Ge, B, Co, Zn, and a combination thereof, $M^4$ is selected from Mo, W, V, and a combination thereof, a is in the range of about 1 to about 5, and b is in the range of about 2 to about 5.

Examples of the above Chemical Formula 2 may be a polyoxometalate ion represented by the following Chemical Formula 2A, Chemical Formula 2B, or Chemical Formula 2C.

$$[(XO_4)MoW_lW_{12-l}O_{36}]^{3-} \quad \text{[Chemical Formula 2A]}$$

In Chemical Formula 2A,
X is selected from P, Si, As, Ge, B, Co, Zn, and a combination thereof, and l is in the range of about 0 to about 12.

$$[(XO_4)Mo_{12-m}V_mO_{36}]^{(3+m)-} \quad \text{[Chemical Formula 2B]}$$

In Chemical Formula 2B,
X is selected from P, Si, As, Ge, B, Co, Zn, and a combination thereof, and m is in the range of about 0 to about 3.

$$[(XO_4)W_{12-n}V_nO_{36}]^{(3+n)-} \quad \text{[Chemical Formula 2C]}$$

In Chemical Formula 2C,
X is selected from P, Si, As, Ge, B, Co, Zn, and a combination thereof, and n is in the range of about 0 to about 3.

The divalent first metal ($M^1$) may be selected from an alkaline-earth metal, a transition element, and a combination thereof. For example, the divalent first metal ($M^1$) may be magnesium (Mg), calcium (Ca), strontium (Sr), nickel (Ni), manganese (Mn), iron (Fe), cobalt (Co), copper (Cu), zinc (Zn), beryllium (Be), and a combination thereof.

The trivalent second metal ($M^2$) may be selected from a Group 13 element of the IUPAC periodic table, a transition element, and a combination thereof. For example, the trivalent second metal ($M^2$) may be aluminum (Al), chromium (Cr), manganese (Mn), iron (Fe), cobalt (Co), lanthanum (La), cerium (Ce), gallium (Ga), indium (In), vanadium (V), and a combination thereof.

The first metal ($M^1$) and the second metal ($M^2$) may be present at a mole ratio of $M^1/M^2$ so as to be in the range of about 2/1 to about 4/1.

The composite metal oxide may be represented by the following Chemical Formula 3.

$$[M^1{}_{1-x}M^2{}_xA]O_y \quad \text{[Chemical Formula 3]}$$

In Chemical Formula 3,
$M^1$ is a divalent metal selected from an alkaline-earth metal, a transition element, and a combination thereof, $M^2$ is a trivalent metal selected from a Group 13 element of the IUPAC periodic table, a transition element, and a combination thereof, A is at least one polyoxometalate (POM) ion selected from an anion represented by the above Chemical Formula 1 and an anion represented by the above Chemical Formula 2, x is in the range of about 0.2 to about 0.4, and y is in the range of about 1 to about 1.3.

A may be selected from a polyoxometalate on selected from $(Mo_6O_{19})^{2-}$, $(W_6O_{19})^{2-}$, $(PMo_{12}O_{40})^{3-}$, $(PW_{12}O_{40})^{3-}$, $(SiMo_{12}O_{40})^{4-}$, $(SiW_{12}O_{40})^{4-}$, $(BMo_{12}O_{40})^{5-}$, $(BW_{12}O_{40})^{5-}$, $(CoMo_{12}O_{40})^{6-}$, $(CoW_{12}O_{40})^{6-}$, $(AsMo_{12}O_{40})^{3-}$, $(AsW_{12}O_{40})^{3-}$, $(GeMo_{12}O_{40})^{4-}$, $(GeW_{12}O_{40})^{4-}$, $(ZnMo_{12}O_{40})^{6-}$, $(PMo_9W_3O_{40})^{3-}$, $(PMo_6W_6O_{40})^{3-}$, $(PMo_3W_9O_{40})^{3-}$, $(PMo_{11}VO_{40})^{3-}$, $(PMo_{10}V_2O_{40})^{3-}$, $(PMo_9V_3O_{40})^{3-}$, $(PW_{11}VO_{40})^{3-}$, $(PW_{10}V_2O_{40})^{3-}$, $(PW_9V_3O_{40})^{3-}$, $(P_2Mo_{18}O_{62})^{6-}$, $(P_2W_{18}O_{62})^{6-}$, $(P_5W_{30}O_{110})^{15-}$, and a combination thereof.

The adsorbent for carbon dioxide may further include at least an alkali metal and/or an oxide of the alkali metal on the surface of the composite metal oxide.

A method of preparing an adsorbent for carbon dioxide may include preparing a first aqueous solution of a salt including a first metal ($M^1$) and a second metal ($M^2$), wherein $M^1$ is selected from an alkaline-earth metal, a transition element, and a combination thereof, and $M^2$ is selected from a Group 13 element of the IUPAC periodic table, a transition element, and a combination thereof. To the first aqueous solution may be added a second aqueous solution of a polyoxometalate-containing salt including at least one polyoxometalate ion selected from an anion represented by Chemical Formula 1 and an anion represented by the following Chemical Formula 2 to ion-exchange an anion of the $M^1/M^2$ salt with the polyoxometalate ion. The method may further include calcining the ion-exchanged resulting material to provide a composite metal oxide.

The first metal ($M^1$) may be selected from magnesium (Mg), calcium (Ca), strontium (Sr), nickel (Ni), manganese (Mn), iron (Fe), cobalt (Co), copper (Cu), zinc (Zn), beryllium (Be), and a combination thereof.

The second metal ($M^2$) may be selected from aluminum (Al), chromium (Cr), manganese (Mn), iron (Fe), cobalt (Co), lanthanum (La), cerium (Ce), gallium (Ga), indium (In), vanadium (V), and a combination thereof.

The salt including the first metal $M^1$ and the second metal $M^2$ may be a layered double hydroxide (LDH) represented by the following Chemical Formula 4.

[Chemical Formula 4]

In Chemical Formula 4, $M^1$ is selected from an alkaline-earth metal, a transition element, and a combination thereof, $M^2$ is selected from a Group 13 element of the IUPAC periodic table, a transition element, and a combination thereof, $A^1$ is an anion selected from a carbonate ion ($CO_3^{2-}$), a nitrate ion ($NO_3^-$), an acetate ion ($CH_3COO^-$), a phosphate ion ($PO_4^{3-}$), a borate ion ($BO_3^{3-}$), a sulfate ion ($SO_4^{2-}$), a chlorine ion ($Cl^-$), a chlorate ion ($ClO_4^-$), a fluorine ion ($F^-$), a hydroxide ion ($OH-$), and a combination thereof, x is in the range of about 0.2 to about 0.4, and k is determined according to valence of the anion ($A^1$).

The aqueous solution including the polyoxometalate-containing salt may have pH of about 3 to about 6.

When the ion-exchanged resulting material is analyzed by X-ray diffraction, the d-spacing of (003) plane at a diffraction angle (2θ) of about 11 to about 11.7 degrees may range from about 7.5 to about 7.9 Å.

The calcining may be performed at a temperature range from about 200° C. to about 700° C.

A capture module for carbon dioxide may include the adsorbent for carbon dioxide. The capture module for carbon dioxide may be configured/designed to allow operation at a temperature of greater than or equal to about 200° C., for example about 200° C. to about 400° C.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "combination thereof" may refer to a mixture, a stacked structure, a composite compound, a reaction product, an alloy, and the like.

According to one embodiment, an adsorbent for carbon dioxide may include a composite metal oxide including a divalent first metal ($M^1$), a trivalent second metal ($M^2$), and at least one polyoxometalate (POM) ion selected from an anion represented by the following Chemical Formula 1 and an anion represented by the following Chemical Formula 2.

$$[M^3{}_6O_{19}]^{2-}$$ [Chemical Formula 1]

In Chemical Formula 1,
$M^3$ is selected from Mo, W, and a combination thereof.

$$[(XO_4)_aM^4{}_{6b}O_{18b}]^{3a-}$$ [Chemical Formula 2]

In Chemical Formula 2,
X is selected from P, Si, As, Ge, B, Co, Zn, and a combination thereof, $M^4$ is selected from Mo, W, V, and a combination thereof, a is in the range of about 1 to about 5, and b is in the range of about 2 to about 5.

The anion in Chemical Formula 1 may be a Lindqvist-type polyoxometalate ion. In Chemical Formula 2, the anion may be a Keggin-type polyoxometalate ion when a is 1 and b is 2, a Wells-Dawson-type polyoxometalate ion when a is 2 and b is 3, and a Preyssler-type polyoxometalate ion when both a and b are 5. However, it should be understood that example embodiments are not limited thereto.

Examples of the above Chemical Formula 2 may be a polyoxometalate ion represented by the following Chemical Formula 2A, Chemical Formula 2B, or Chemical Formula 2C.

$$[(XO_4)Mo_lW_{12-l}O_{36}]^{3-}$$ [Chemical Formula 2A]

In Chemical Formula 2A,
X is selected from P, Si, As, Ge, B, Co, Zn, and a combination thereof, and l is in the range of about 0 to about 12.

$$[(XO_4)Mo_{12-m}V_mO_{36}]^{(3+m)-}$$ [Chemical Formula 2B]

In Chemical Formula 2B,
X is selected from P, Si, As, Ge, B, Co, Zn, and a combination thereof, and m is in the range of about 0 to about 3.

$$[(XO_4)W_{12-n}V_nO_{36}]^{(3+n)-}$$ [Chemical Formula 2C]

In Chemical Formula 2C,
X is selected from P, Si, As, Ge, B, Co, Zn, and a combination thereof, and n is in the range of about 0 to about 3.

The divalent first metal ($M^1$) may be selected from an alkaline-earth metal, transition elements, and a combination thereof. For example, the divalent first metal ($M^1$) may be magnesium (Mg), calcium (Ca), strontium (Sr), nickel (Ni), manganese (Mn), iron (Fe), cobalt (Co), copper (Cu), zinc (Zn), beryllium (Be), and a combination thereof.

The trivalent second metal ($M^2$) may be selected from a Group 13 element of the IUPAC periodic table, a transition element, and a combination thereof. For example, the trivalent second metal ($M^2$) may be aluminum (Al), chromium (Cr), manganese (Mn), iron (Fe), cobalt (Co), lanthanum (La), cerium (Ce), gallium (Ga), indium (In), vanadium (V), and a combination thereof. The trivalent second metal ($M^2$) may play a role in transferring charges to the first metal ($M^1$).

In one embodiment, the first metal ($M^1$) and the second metal ($M^2$) may be different from each other.

The first metal ($M^1$) and the second metal ($M^2$) may be present at a mole ratio of $M^1/M^2$ in the range of about 2/1 to about 4/1. When the first metal is present at a higher mole ratio than that of the second metal, the first metal has a higher basicity, so the composite metal oxide may increase its basic characteristics to provide a higher adsorption performance to an acidic gas (e.g., $CO_2$, etc.).

The polyoxometalate ion represented by Chemical Formula 1 and Chemical Formula 2, which is a polyatomic acid, has a relatively strong basicity and includes many oxygen atoms, so it may provide a basic active site for adsorbing carbon dioxide to a composite metal oxide. In addition, since the polyoxometalate ion represented by Chemical Formula 2B or Chemical Formula 2C (in which a part of Mo or W is substituted with V) has a relatively strong basicity, a composite metal oxide having a desired level of adsorption performance of carbon dioxide may be provided.

The composite metal oxide may be represented by the following Chemical Formula 3.

$$[M^1{}_{1-x}M^2{}_xA]O_y$$ [Chemical Formula 3]

In Chemical Formula 3,
$M^1$ is a divalent metal selected from an alkaline-earth metal, a transition element, and a combination thereof, $M^2$ is trivalent metal selected from a Group 13 element of the IUPAC periodic table, a transition element, and a combination thereof, A is at least one polyoxometalate (POM) ion selected from an anion represented by the above Chemical Formula 1 and an anion represented by the above Chemical Formula 2, x is in the range of about 0.2 to about 0.4, and y is in the range of about 1 to about 1.3.

A may be selected from a polyoxometalate ion selected from $(Mo_6O_{19})^{2-}$, $(W_6O_{19})^{2-}$, $(PMo_{12}O_{40})^{3-}$, $(PW_{12}O_{40})^{3-}$, $(SiMo_{12}O_{40})^{4-}$, $(SiW_{12}O_{40})^{4-}$, $(BMo_{12}O_{40})^{5-}$, $(BW_{12}O_{40})^{5-}$, $(CoMo_{12}O_{40})^{6-}$, $(CoW_{12}O_{40})^{6-}$, $(AsMo_{12}O_{40})^{3-}$, $(AsW_{12}O_{40})^{3-}$, $(GeMo_{12}O_{40})^{4-}$, $(GeW_{12}O_{40})^{4-}$, $(ZnMo_{12}O_{40})^{6-}$, $(PMo_9W_3O_{40})^{3-}$, $(PMo_6W_6O_{40})^{3-}$, $(PMo_3W_9O_{40})^{3-}$, $(PMo_{11}VO_{40})^{3-}$, $(PMo_{10}V_2O_{40})^{3-}$, $(PMo_9V_3O_{40})^{3-}$, $(PW_{11}VO_{40})^{3-}$, $(PW_{10}V_2O_{40})^{3-}$, $(PW_9V_3O_{40})^{3-}$, $(P_2Mo_{18}O_{62})^{6-}$, $(P_2W_{18}O_{62})^{6-}$, $(P_5W_{30}O_{110})^{15-}$, and a combination thereof.

The adsorbent for carbon dioxide may further include at least an alkali metal and/or an oxide of the alkali metal on the surface of the composite metal oxide. The alkali metal and/or the alkali metal oxide may be included in an amount of about 1 to about 10 parts by weight based on 100 parts by weight of the composite metal oxide. When the alkali metal and/or the alkali metal oxide is included within the above range, it may make the base property of an adsorbent for carbon dioxide stronger and improve the adsorption performance of carbon dioxide.

According to another example embodiment, a method of preparing an adsorbent for carbon dioxide is provided.

Figure 1:
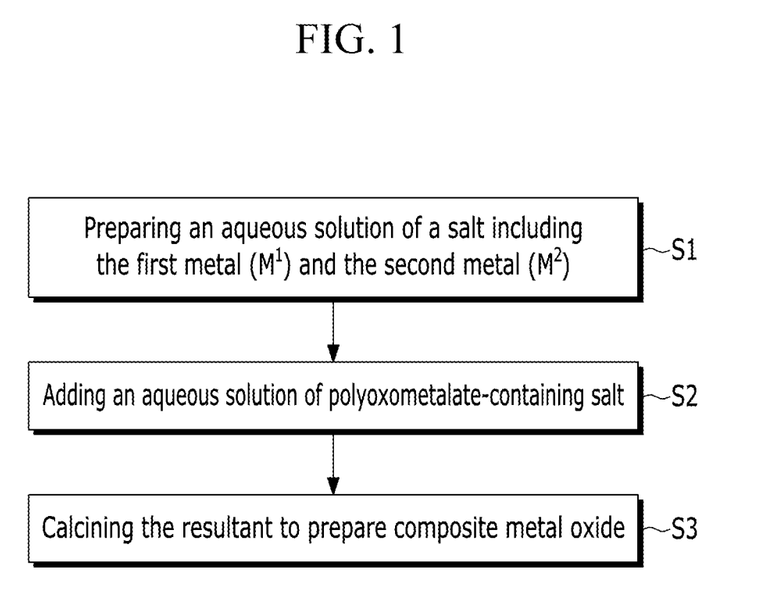
FIG. 1 is a flowchart showing a process of preparing an adsorbent for carbon dioxide according to one example embodiment.

First, an aqueous solution of a salt including a first metal $M^1$ and a second metal $M^2$ is prepared (S1). The first metal ($M^1$) is selected from an alkaline-earth metal, a transition element, and a combination thereof, and the second metal ($M^2$) is selected from a Group 13 element of the IUPAC periodic table, a transition element, and a combination thereof.

An aqueous solution including a polyoxometalate-containing salt including at least one polyoxometalate ion selected from an anion represented by Chemical Formula 1 and/or an anion represented by Chemical Formula 2 is added into the aqueous solution of the $M^1/M^2$ salt to ion-exchange an anion of the $M^1/M^2$ salt with a polyoxometalate ion of the polyoxometalate-containing salt (S2).

The first metal ($M^1$) may be selected from magnesium (Mg), calcium (Ca), strontium (Sr), nickel (Ni), manganese (Mn), iron (Fe), cobalt (Co), copper (Cu), zinc (Zn), beryllium (Be), and a combination thereof.

The second metal ($M^2$) may be selected from aluminum (Al), chromium (Cr), manganese (Mn), iron (Fe), cobalt (Co), lanthanum (La), cerium (Ce), gallium (Ga), indium (In), vanadium (V), and a combination thereof.

The salt including the first metal $M^1$ and the second metal $M^2$ may be a layered double hydroxide (LDH) represented by the following Chemical Formula 4.

$$[M^1_{1-x}M^2_x(OH)_2](A^1)_{x/k}]$$  [Chemical Formula 4]

In Chemical Formula 4, $M^1$ is selected from an alkaline-earth metal, a transition element, and a combination thereof, $M^2$ is selected from a Group 13 element of the IUPAC periodic table, a transition element, and a combination thereof, $A^1$ is an anion selected from a carbonate ion ($CO_3^{2-}$), a nitrate ion ($NO_3^-$), an acetate ion ($CH_3COO^-$), a phosphate ion ($PO_4^{3-}$), a borate ion ($BO_3^{3-}$), a sulfate ion ($SO_4^{2-}$), a chlorine ion ($Cl^-$), a chlorate ion ($ClO_4^-$), a fluorine ion ($F^-$), a hydroxide ion (OH—), and a combination thereof, x is in the range of about 0.2 to about 0.4, and k is determined according to valence of the anion ($A^1$).

An aqueous solution including the polyoxometalate-containing salt may be added in a dropwise manner to the aqueous solution of the salt including the first metal $M^1$ and the second metal $M^2$.

The aqueous solution including the polyoxometalate-containing salt may have a pH of about 3 to about 6. Since the aqueous solution including the polyoxometalate-containing salt is acidic, an additional pH controlling agent is not required.

As stated above, it may be beneficial for the pH to be controlled to be acidic, so that the polyoxometalate ion may be ion-exchanged with an anion of the $M^1/M^2$ salt without deforming the structure of the salt including the first metal $M^1$ and the second metal $M^2$. Examples of the salt including the first metal $M^1$ and the second metal $M^2$ include a layered double hydroxide. When the ion-exchanged salt is analyzed by X-ray diffraction, a d-spacing of the (003) plane at a diffraction angle (2θ) of about 11 to about 11.7 degrees may range from about 7.5 to about 7.9 Å. From the results, it is confirmed that the ion-exchange is performed without structure deformation (such as a change in the extended interlayer distance between metal layers) even though the polyoxometalate ion is ion-exchanged with the anion of the salt including the first metal $M^1$ and the second metal $M^2$. In other words, it may be said that the polyoxometalate ions are not intercalated between the metal layers but is impregnated or stacked in the layered structure.

The ion-exchanged resulting material is calcined to provide a composite metal oxide (S3). Before the calcining, filtering and drying processes may be performed.

The filtering process may be performed in a centrifuge process or using a filter.

The drying process may be performed at a temperature of about −50° C. to about 100° C. according to a vacuum-drying or freeze-drying method.

The calcining process may be performed at a temperature range from about 200° C. to about 700° C., specifically, about 300° C. to about 500° C., and more specifically, about 400° C. to about 500° C. The calcining process may be performed with ambient air or under an oxygen atmosphere. The calcining process has no particular limit, but may be performed for about one hour to about 20 hours. When the calcining process is performed within the above range, a composite metal oxide having adsorption performance may be obtained.

According to another example embodiment, a capture module for carbon dioxide, which includes the above-described adsorbent for carbon dioxide, is provided. The adsorbent for carbon dioxide may be filled in a column and the like, but has no particular limit with regard to its containment. The adsorbent for carbon dioxide has increased thermal stability so it shows a desired level of adsorption performance at a temperature of greater than or equal to about 200° C., for example, about 200° C. to about 400° C.

The adsorbent for carbon dioxide has improved adsorption performance (capture capacity) and may work at a relatively high temperature. Due to its higher adsorption performance for carbon dioxide, the adsorbent may be used for adsorbing pre-combustion carbon dioxide as well as for adsorbing carbon dioxide generated by combustion.

Hereinafter, some previously-disclosed embodiments are illustrated in more detail with reference to various examples. However, it should be understood that the following are merely example embodiments and are not meant to be limiting.

EXAMPLES

Example 1

Preparation of Composite Metal Oxide 5.0 g of hydrotalcite ($Mg_4Al_2(OH)_{12}(CO_3) \cdot 4H_2O$, Sigma-Aldrich) is dissolved in 100 mL of distilled water to provide a hydrotalcite aqueous solution. Separately, 0.01 M of a POM (polyoxometalate) solid acid ($H_3PMo_{12}O_{40}$) aqueous solution is prepared. 15 ml of the POM solid acid solution is added into the hydrotalcite solution, and agitated at 60° C. for 6 hours and filtered and cleaned and then dried at room temperature (about 25° C.) for 2 days to provide a POM-ion exchanged layered double hydroxide. The POM-ion exchanged layered double hydroxide is calcined at 400° C. for 5 hours to provide a composite metal oxide. The composite metal oxide is used as an adsorbent for carbon dioxide.

Example 2

Preparation of Composite Metal Oxide 5.0 g of hydrotalcite ($Mg_4Al_2(OH)_{12}(CO_3) \cdot 4H_2O$, Sigma-Aldrich) is dissolved in 100 mL of distilled water to provide a hydrotalcite aqueous solution. Separately, 0.01 M of a V-substituted POM (polyoxometalate) solid acid ($H_3PMo_9V_3O_{40}$) aqueous solution is prepared. 15 ml of the POM solid acid solution is added into the hydrotalcite solution, and agitated at 60° C. for 6 hours and filtered and cleaned and then dried at room temperature (about 25° C.) for 2 days to provide a POM-ion exchanged layered double hydroxide. The POM-ion exchanged layered double hydroxide is calcined at 400° C. for 5 hours to provide a composite metal oxide. The composite metal oxide is used as an adsorbent for carbon dioxide.

Example 3

Preparation of Composite Metal Oxide 5.0 g of a layered double hydroxide ($Mg_4Al_2(OH)_{12}(NO_3) \cdot 4H_2O$) synthesized using aluminum nitrate ($Al(NO_3)_3 \cdot 9H_2O$), magnesium nitrate ($Mg(NO_3)_2 \cdot 6H_2O$), and sodium hydroxide (NaOH) according to precipitation is dissolved in 100 ml of distilled water to provide an aqueous solution. Separately, 0.01 M of a V-substituted POM (polyoxometalate) solid acid ($H_3PMo_9V_3O_{40}$) aqueous solution is prepared. 15 ml of the POM solid acid solution is added into the layered double hydroxide aqueous solution, and agitated at 60° C. for 6 hours and filtered and cleaned and then dried at room temperature (about 25° C.) for 2 days to provide a POM-ion exchanged layered double hydroxide. The POM-ion exchanged layered double hydroxide is calcined at 400° C. for 5 hours to provide a composite metal oxide. The composite metal oxide is used as an adsorbent for carbon dioxide.

Comparative Example 1

Hydrotalcite ($Mg_4Al_2(OH)_{12}(CO_3) \cdot 4H_2O$, Sigma-Aldrich) is used as an adsorbent for carbon dioxide.

Comparative Example 2

A layered double hydroxide ($Mg_4Al_2(OH)_{12}(NO_3) \cdot 4H_2O$) is synthesized using aluminum nitrate ($Al(NO_3)_3 \cdot 9H_2O$), magnesium nitrate ($Mg(NO_3)_2 \cdot 6H_2O$), and sodium hydroxide (NaOH) according to precipitation. The layered double hydroxide is used as an adsorbent for carbon dioxide.

Figure 2:
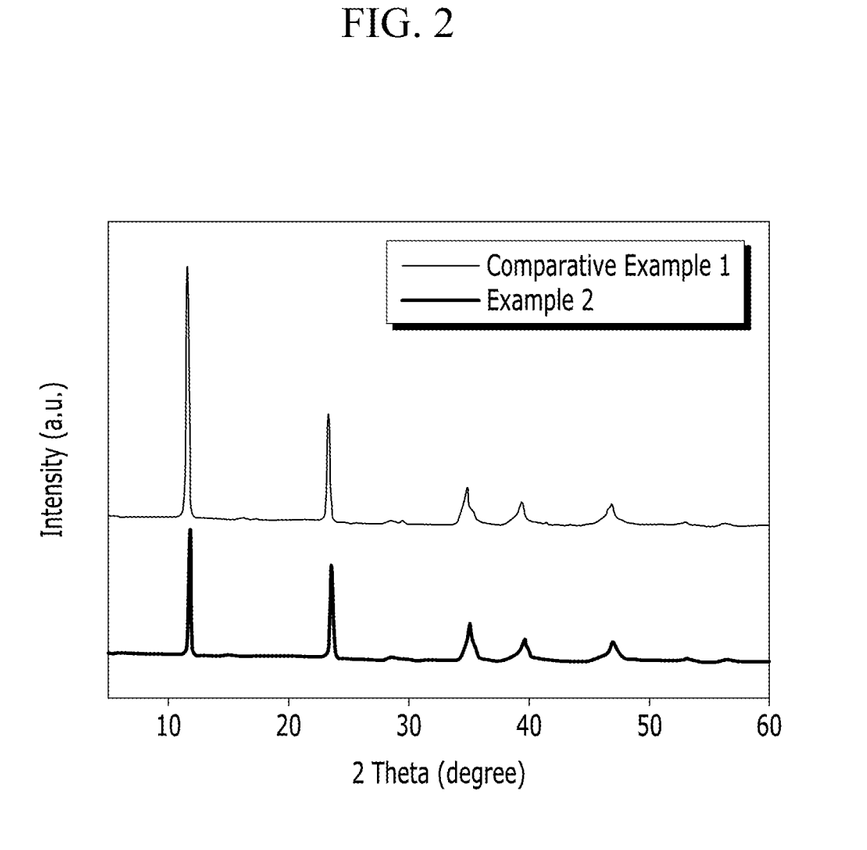
FIG. 2 shows X-ray diffraction (XRD) analysis results of a layered double hydroxide according to Example 2 (in which an intermediate of a POM is ion-exchanged) and a layered double hydroxide according to Comparative Example 1.
Figure 3:
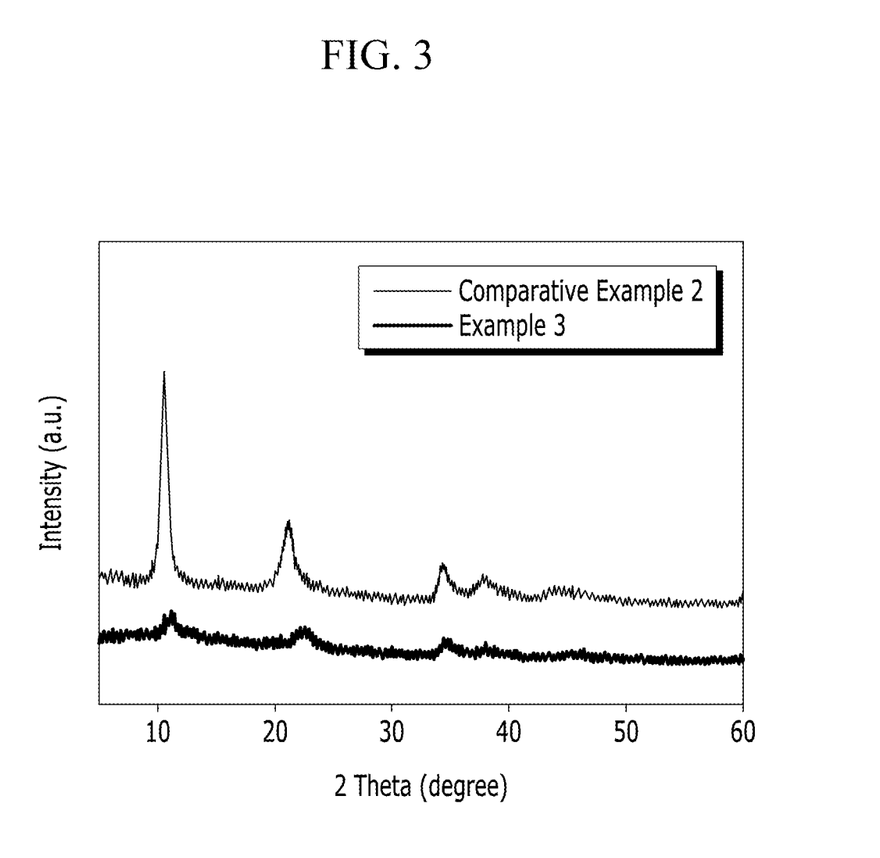
FIG. 3 shows X-ray diffraction (XRD) analysis results of a layered double hydroxide according to Example 3 (in which an intermediate of a POM is ion-exchanged) and a layered double hydroxide according to Comparative Example 2.

In order to check whether each POM according to Examples 2 and 3 is intercalated into the structure of the ion-exchanged double hydroxide or deforms the structure, the double hydroxides according to Examples 2 and 3 in which an intermediate POM is ion-exchanged and those according to Comparative Example 1 and Comparative Example 2 are analyzed by X-ray diffraction (XRD), and the results are shown in FIG. 2 and FIG. 3, respectively. X-ray diffraction analysis is performed at a scan speed of 0.2 degree per second using a Cu Kα-ray driving at 40 kV and 40 mA (Philips X'pert X-ray diffractometer).

As shown in FIG. 2, the peak of the layered double hydroxide according to Example 2 in which the intermediate of POM is ion-exchanged corresponds with the peak of hydrotalcite according to Comparative Example 1, thus indicating that the structure is not deformed even though the POM is ion-exchanged.

In addition, as shown in FIG. 3, comparing Example 3 to Comparative Example 2, the peak position is not changed although the peak size (intensity) is changed, thus confirming that the POM is ion-exchanged without intercalating between metal layers of the double hydroxide. As a result, the structure is not deformed.

The following Table 1 shows ICP (inductively coupled plasma) analysis results of the layered double hydroxides according to Examples 1 to 3 in which the intermediate of POM is ion-exchanged with the layered double hydroxides according to Comparative Examples 1 and 2.

TABLE 1

|  | Mg (wt %) | Al (wt %) | P (wt %) | V (wt %) | Mo (wt %) |
|---|---|---|---|---|---|
| Example 1 | 27.70 | 14.05 | 0.09 | ND | 0.25 |
| Example 2 | 27.97 | 14.22 | 0.08 | 0.27 | 0.05 |
| Example 3 | 23.18 | 10.73 | 0.40 | 1.87 | 8.44 |
| Comparative Example 1 | 30.36 | 15.15 | ND | ND | ND |
| Comparative Example 2 | 28.82 | 11.32 | ND | ND | ND |

Note)
ND: Not detected

As shown in Table 1, the composite metal oxide according to Example 1 in which POM is ion-exchanged and calcined is detected for P and Mo; and the composite metal oxide according to Example 2 in which POM is ion-exchanged and calcined is detected for P, V, and Mo, so it is understood that the POM is ion-exchanged. In addition, greater amounts of P, V, and Mo in Example 3 are detected compared to Example 2, so it is confirmed that the POM in the layered double hydroxide having the $NO^{3-}$ anion is more ion-exchanged than the hydrotalcite having $CO^{3-}$. For example, it may be said that a more basic active site in which it is easier to adsorb carbon dioxide is provided from the more ion-exchanged POM.

Figure 4:
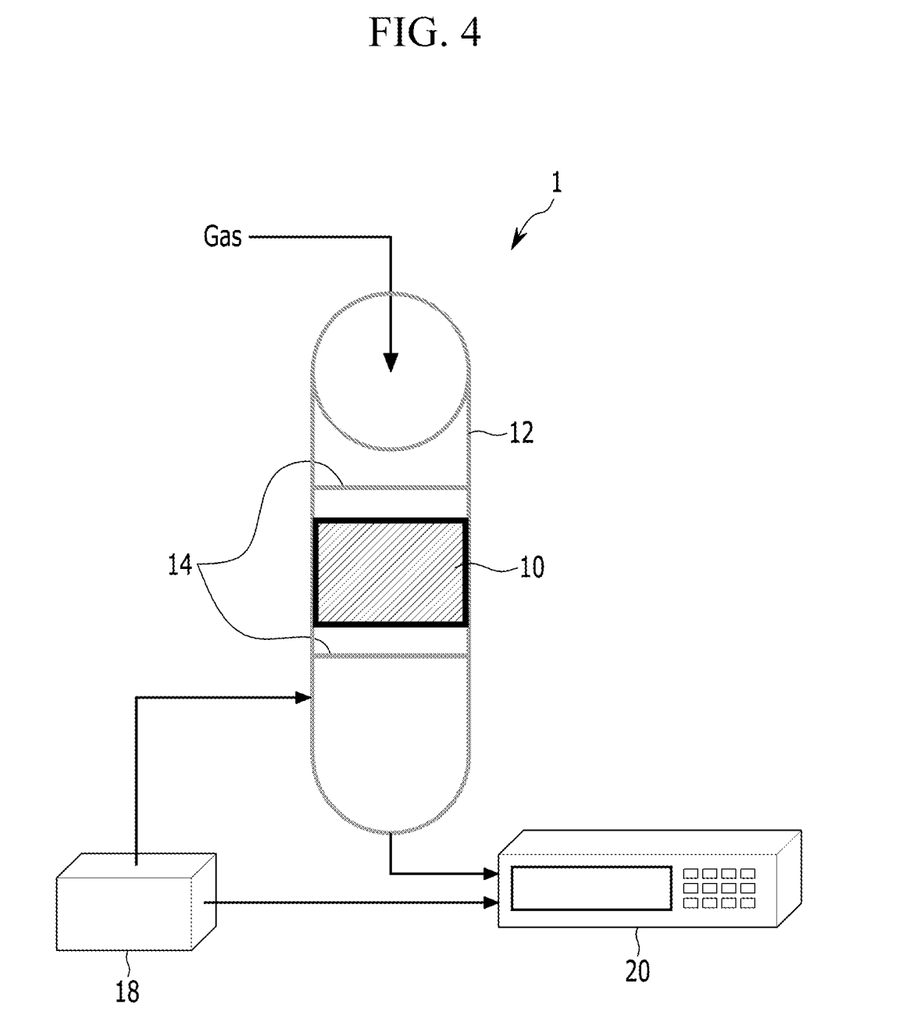
FIG. 4 is a schematic diagram showing an equipment for analyzing adsorption performance of carbon dioxide.

In order to evaluate the adsorption performance of adsorbents for carbon dioxide according to Example 1, Example 2, and Comparative Example 1, 0.25 g of each of the adsorbents 10 for carbon dioxide according to Example 1, Example 2, and Comparative Example 1 is filled in a column 14 of an adsorption bed of a furnace 12 in an equipment 1 for measuring adsorption performance of carbon dioxide shown in FIG. 4. Then a mixed gas of 40 vol % $CO_2$/60 vol % $H_2$ is flowed as 200 ml/min under the condition of 200° C. and 1 bar. The flow rate and pressure of the mixed gas while evaluating the adsorption performance are controlled by a separate control device 18. The adsorption performance is determined by measuring the concentration of carbon dioxide exhausted into a gas analyzer 20. $CO_2$ adsorption performance (capture capacity) of the composite metal oxides according to Example 1, Example 2, and Comparative Example 1 is shown in the following Table 2.

Each of 0.25 g of adsorbents for carbon dioxide according to Example 3 and Comparative Example 2 is filled in a quartz column and flowed with a pre-combustion mixed gas having a composition of 40 vol % $CO_2$/60 vol % $H_2$ at a flow rate of 200 ml/min at 200° C. and 1 bar.

In Table 2 and Table 3, 90% BT (breakthrough) refers to the $CO_2$ amount adsorbed in 1 g of adsorbent until when $CO_2$ is not adsorbed any more and 10% of the initial $CO_2$ amount is detected in the breakthrough curve.

TABLE 2

| Adsorption performance | Example 1 | Example 2 | Comparative Example 1 |
|---|---|---|---|
| BT (breakthrough) 90% $CO_2$ adsorption performance per 1 g of adsorbent | 1.68 mmol | 4.23 mmol | 0.85 mmol |

TABLE 3

| Adsorption performance | Example 3 | Comparative Example 2 |
|---|---|---|
| BT (breakthrough) 90% $CO_2$ adsorption performance per 1 g of adsorbent | 5.55 mmol | 0.7 mmol |

As shown in Table 2, the adsorbent for carbon dioxide according to Example 2 has improved adsorption performance by about 5 times compared to the adsorbent for carbon dioxide according to Comparative Example 1. As shown in Table 3, the adsorbent for carbon dioxide according to Example 3 has a greater adsorption performance for carbon dioxide by about 8 times compared to the adsorbent for carbon dioxide according to Comparative Example 2.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An adsorbent for carbon dioxide, comprising:
a composite metal oxide including a divalent first metal ($M^1$), a trivalent second metal ($M^2$), and at least one polyoxometalate (POM) ion, the at least one polyoxometalate (POM) ion selected from an anion represented by Chemical Formula 1 and an anion represented by Chemical Formula 2, $$[M^3{}_6O_{19}]^{2-} \qquad \text{[Chemical Formula 1]}$$

$M^3$ being selected from at least one of Mo and W, $$[(XO_4)_a M^4{}_{6b} O_{18b}]^{3a-} \qquad \text{[Chemical Formula 2]}$$

X being selected from at least one of P, Si, As, Ge, B, Co, and Zn,
$M^4$ being selected from at least one of Mo, W, and V,
a being in a range of about 1 to about 5, and
b being in a range of about 2 to about 5.

2. The adsorbent for carbon dioxide of claim 1, wherein Chemical Formula 2 is further represented by at least one of Chemical Formula 2A, Chemical Formula 2B, and Chemical Formula 2C, $$[(XO_4)Mo_l W_{12-l} O_{36}]^{3-} \qquad \text{[Chemical Formula 2A]}$$

l being in a range of about 0 to about 12, $$[(XO_4)Mo_{12-m} V_m O_{36}]^{(3+m)-} \qquad \text{[Chemical Formula 2B]}$$

m being in a range of about 0 to about 3, $$[(XO_4)W_{12-n} V_n O_{36}]^{(3+n)-} \qquad \text{[Chemical Formula 2C]}$$

n being in a range of about 0 to about 3.

3. The adsorbent for carbon dioxide of claim 1, wherein the divalent first metal ($M^1$) is at least one of an alkaline-earth metal and a transition element.

4. The adsorbent for carbon dioxide of claim 3, wherein the divalent first metal ($M^1$) is at least one of magnesium (Mg), calcium (Ca), strontium (Sr), nickel (Ni), manganese (Mn), iron (Fe), cobalt (Co), copper (Cu), zinc (Zn), and beryllium (Be).

5. The adsorbent for carbon dioxide of claim 1, wherein the trivalent second metal ($M^2$) is at least one of a Group 13 element and a transition element.

6. The adsorbent for carbon dioxide of claim 5, wherein the trivalent second metal ($M^2$) is at least one of aluminum (Al), chromium (Cr), manganese (Mn), iron (Fe), cobalt (Co), lanthanum (La), cerium (Ce), gallium (Ga), indium (In), and vanadium (V).

7. The adsorbent for carbon dioxide of claim 1, wherein the first metal ($M^1$) and the second metal ($M^2$) are present at a mole ratio of $M^1/M^2$ so as to be in a range of about 2/1 to about 4/1.

8. The adsorbent for carbon dioxide of claim 1, wherein the composite metal oxide is represented by Chemical Formula 3, $$[M^1{}_{1-x} M^2{}_x A]O_y \qquad \text{[Chemical Formula 3]}$$

$M^1$ being at least one of an alkaline-earth metal and a transition element,
$M^2$ being at least one of a Group 13 element and a transition element,
A being the at least one polyoxometalate (POM) ion,
x being in a range of about 0.2 to about 0.4, and
y being in a range of about 1 to about 1.3.

9. The adsorbent for carbon dioxide of claim 8, wherein A is at least one of $(Mo_6O_{19})^{2-}$, $(W_6O_{19})^{2-}$, $(PMo_{12}O_{40})^{3-}$, $(PW_{12}O_{40})^{3-}$, $(SiMo_{12}O_{40})^{4-}$, $(SiW_{12}O_{40})^{4-}$, $(BMo_{12}O_{40})^{5-}$, $(BW_{12}O_{40})^{5-}$, $(CoMo_{12}O_{40})^{6-}$, $(CoW_{12}O_{40})^{6-}$, $(AsMo_{12}O_{40})^{3-}$, $(AsW_{12}O_{40})^{3-}$, $(GeMo_{12}O_{40})^{4-}$, $(GeW_{12}O_{40})^{4-}$, $(ZnMo_{12}O_{40})^{6-}$, $(PMo_9W_3O_{40})^{3-}$, $(PMo_6W_6O_{40})^{3-}$, $(PMo_3W_9O_{40})^{3-}$, $(PMo_{11}VO_{40})^{3-}$, $(PMo_{10}V_2O_{40})^{3-}$, $(PMo_9V_3O_{40})^{3-}$, $(PW_{11}VO_{40})^{3-}$, $(PW_{10}V_2O_{40})^{3-}$, $(PW_9V_3O_{40})^{3-}$, $(P_2Mo_{18}O_{62})^{6-}$, $(P_2W_{18}O_{62})^{6-}$, and $(P_5W_{30}O_{110})^{15-}$.

10. The adsorbent for carbon dioxide of claim 1, further comprising:
at least one of an alkali metal and an oxide of the alkali metal on a surface of the composite metal oxide.

11. A capture module for carbon dioxide comprising the adsorbent for carbon dioxide of claim 1.

12. The capture module for carbon dioxide of claim 11, wherein the capture module is configured for operation at a temperature of greater than or equal to about 200° C.

13. A method of preparing an adsorbent for carbon dioxide, comprising:
preparing a first aqueous solution of a first salt including a first metal ($M^1$) and a second metal ($M^2$), $M^1$ being at least one of an alkaline-earth metal and a transition element, $M^2$ being at least one of a Group 13 element and a transition element;
adding a second aqueous solution of a polyoxometalate-containing second salt into the first aqueous solution to ion-exchange a first anion of the first salt with a second anion of the polyoxometalate-containing second salt to obtain an ion-exchanged salt, the second anion being a polyoxometalate ion represented by at least one of Chemical Formula 1 and Chemical Formula 2; and
calcinating the ion-exchanged salt to provide a composite metal oxide, $$[M^3{}_6O_{19}]^{2-} \qquad \text{[Chemical Formula 1]}$$

$M^3$ being at least one of Mo and W, $$[(XO_4)_a M^4{}_{6b} O_{18b}]^{3a-} \qquad \text{[Chemical Formula 2]}$$

X being at least one of P, Si, As, Ge, B, Co, and Zn,
$M^4$ being at least one of Mo, W, and V,
a being in a range of about 1 to about 5, and
b being in a range of about 2 to about 5.

14. The method of claim 13, wherein the adding a second aqueous solution includes Chemical Formula 2 being further represented by at least one of Chemical Formula 2A, Chemical Formula 2B, and Chemical Formula 2C, $$[(XO_4)Mo_l W_{12-l} O_{36}]^{3-} \qquad \text{[Chemical Formula 2A]}$$

l being in a range of about 0 to about 12, $$[(XO_4)Mo_{12-m} V_m O_{36}]^{(3+m)-} \qquad \text{[Chemical Formula 2B]}$$

m being in a range of about 0 to about 3, $$[(XO_4)W_{12-n} V_n O_{36}]^{(3+n)-} \qquad \text{[Chemical Formula 2C]}$$

n being in a range of about 0 to about 3.

15. The method of claim 13, wherein the preparing a first aqueous solution includes the first metal ($M^1$) being divalent and being at least one of magnesium (Mg), calcium (Ca), strontium (Sr), nickel (Ni), manganese (Mn), iron (Fe), cobalt (Co), copper (Cu), zinc (Zn), and beryllium (Be).

16. The method of claim 13, wherein the preparing a first aqueous solution includes the second metal ($M^2$) being trivalent and being at least one of a Group 13 element and a transition element.

17. The method of claim 13, wherein the preparing a first aqueous solution includes the second metal ($M^2$) being at least one of aluminum (Al), chromium (Cr), manganese (Mn), iron (Fe), cobalt (Co), lanthanum (La), cerium (Ce), gallium (Ga), indium (In), and vanadium (V).

18. The method of claim 13, wherein the preparing a first aqueous solution includes the first salt being a layered double hydroxide (LDH).

19. The method of claim 18, wherein the preparing a first aqueous solution includes the layered double hydroxide (LDH) being represented by Chemical Formula 4, $$[M^1_{1-x}M^2_x(OH)_2](A^1)_{x/k}] \quad \text{[Chemical Formula 4]}$$

$A^1$ being at least one of a carbonate ion ($CO_3^{2-}$), a nitrate ion ($NO_3^-$), an acetate ion ($CH_3COO^-$), a phosphate ion ($PO_4^{3-}$), a borate ion ($BO_3^{3-}$), a sulfate ion ($SO_4^{2-}$), a chlorine ion ($Cl^-$), a chlorate ion ($ClO_4^-$), a fluorine ion ($F^-$), and a hydroxide ion (OH—), x being in a range of about 0.2 to about 0.4, and k being a real number that is determined according to a valence of $A^1$.

20. The method of claim 13, wherein the adding a second aqueous solution includes the second aqueous solution having a pH of about 3 to about 6.

21. The method of claim 13, wherein the adding a second aqueous solution results in the ion-exchanged salt having a d-spacing of a (003) plane at a diffraction angle (2θ) of about 11 to about 11.7 degrees ranging from about 7.5 to about 7.9 Å when analyzed by X-ray diffraction.

22. The method of claim 13, wherein the calcining is performed at a temperature ranging from about 200° C. to about 700° C.

* * * * *